United States Patent
Hsiao et al.

(10) Patent No.: US 9,557,557 B2
(45) Date of Patent: Jan. 31, 2017

(54) ELECTRO-WETTING DISPLAY PANEL AND ELECTRO-WETTING DISPLAY APPARATUS

(71) Applicant: SHENZHEN CHINA STAR OPTOELECTRONICS TECHNOLOGY CO., LTD., Guangdong (CN)

(72) Inventors: Yu-Chun Hsiao, Guangdong (CN); Shih Hsiang Chen, Guangdong (CN); Guofu Tang, Guangdong (CN); Quan Li, Guangdong (CN); Chengling Lv, Guangdong (CN); Chaofan Guo, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 191 days.

(21) Appl. No.: 14/408,750

(22) PCT Filed: Oct. 28, 2014

(86) PCT No.: PCT/CN2014/089635
§ 371 (c)(1),
(2) Date: Dec. 17, 2014

(87) PCT Pub. No.: WO2016/061830
PCT Pub. Date: Apr. 28, 2016

(65) Prior Publication Data
US 2016/0259160 A1 Sep. 8, 2016

(30) Foreign Application Priority Data
Oct. 22, 2014 (CN) .......................... 2014 1 0566708

(51) Int. Cl.
*G02B 26/00* (2006.01)
*G02B 26/02* (2006.01)

(52) U.S. Cl.
CPC ............. *G02B 26/005* (2013.01); *G02B 26/02* (2013.01)

(58) Field of Classification Search
USPC .................................. 359/290–296
See application file for complete search history.

(56) References Cited

U.S. PATENT DOCUMENTS

| 9,140,893 B1 * | 9/2015 | Zhao ................... G02B 26/005 |
| 2009/0027317 A1 | 1/2009 | Cheng et al. |
| 2010/0302615 A1 | 12/2010 | Aubert et al. |

(Continued)

FOREIGN PATENT DOCUMENTS

| CN | 101355836 A | 1/2009 |
| CN | 102269867 A | 12/2011 |

(Continued)

*Primary Examiner* — Mohammed Hasan
(74) *Attorney, Agent, or Firm* — Osha Liang LLP (57) ABSTRACT

An electro-wetting display panel is provided. The electro-wetting display panel comprises a first transparent substrate, a second transparent substrate, and pixel units. The pixel units comprise first electrodes, a first hydrophobic layer, a plurality of first barriers, a second electrode, a polarized liquid and a plurality of first non-polarized liquids. The hysteresis phenomenon of the non-polarized liquids can be prevented by using the recess areas on the hydrophobic layer.

8 Claims, 5 Drawing Sheets

(56) References Cited

U.S. PATENT DOCUMENTS

| | | | |
|---|---|---|---|
| 2012/0243071 A1 | 9/2012 | Lee et al. | |
| 2012/0320445 A1 | 12/2012 | Yang et al. | |
| 2013/0222879 A1* | 8/2013 | Kuo | G02B 26/005 359/290 |
| 2013/0301108 A1* | 11/2013 | Lim | G02B 26/005 359/290 |
| 2013/0335804 A1 | 12/2013 | Sung et al. | |

FOREIGN PATENT DOCUMENTS

| | | |
|---|---|---|
| CN | 102692778 A | 9/2012 |
| CN | 103439790 A | 12/2013 |
| CN | 103955055 A | 7/2014 |

* cited by examiner

FIG.1

PRIOR ART

ELECTRO-WETTING DISPLAY PANEL AND ELECTRO-WETTING DISPLAY APPARATUS

FIELD OF THE INVENTION

The present invention relates to a display technology, and more particularly to an electro-wetting display panel and an electro-wetting display apparatus.

BACKGROUND OF THE INVENTION

Figure 1:
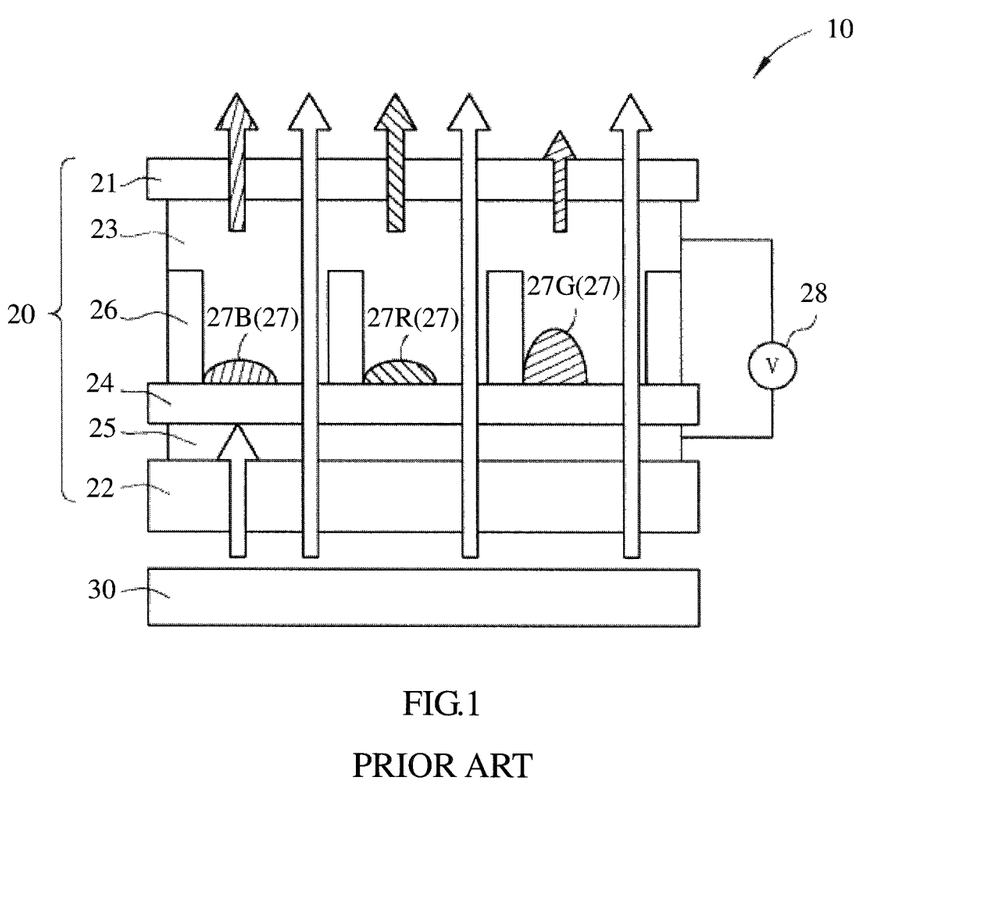
FIG. 1 is a schematic diagram showing a conventional electro-wetting display.

FIG. 1 is a schematic diagram showing a conventional electro-wetting display. As shown in FIG. 1, the conventional electro-wetting display 10 comprises an electro-wetting display panel 20 and a backlight module 30. The electro-wetting display panel 20 includes two opposite and transparent substrates 21 and 22, and a polarized liquid 23, a hydrophobic dielectric layer 24, transparent electrodes 25, walls 26 and oil layer 27 (non-polarized liquid) of different colors are disposed between the two transparent substrates 21 and 22, and the oil layer 27 includes a red oil 27R, a green oil 27G, and a blue oil 27B. When a voltage from a voltage source 28 is applied between the transparent electrodes 25 and the polarized liquid 23, a surface tension between the polarized liquid 23 and the hydrophobic dielectric layer 24 can be modified, so as to control the positions of the oils. Therefore, by passing through the oil layer 27 of different colors, a white light LW emitted from the backlight module 30 can be transferred into a red light LR, a green light LG, or a blue light LB having different gray-scales, thereby forming a full-color display effect.

In the conventional electro-wetting display, the transparent electrodes 25 are uniformly formed on the transparent substrate 22, and a uniform electric field is formed on the transparent electrodes 25. However, while continuously displaying images of different gray-scales, the polarized liquid 23 and the oil layer 27 may be affected by other forces, and thus a hysteresis phenomenon occurs. The hysteresis phenomenon results in a difference between an actual area of the oil layer 27 on the transparent substrate 22 and a predetermined area of the oil layer 27 thereon, and it will result in a poor performance of the gray-scales of the conventional electro-wetting display, thereby greatly degrading a display quality.

As a result, it is necessary to provide an electro-wetting display panel and an electro-wetting display apparatus, so as to solve the problems existing in the conventional technologies as described above.

SUMMARY OF THE INVENTION

The present invention provides an electro-wetting display panel and an electro-wetting display apparatus for preventing the hysteresis phenomenon of the oil layer, so as to prevent the problem of a poor display quality resulting from the hysteresis phenomenon.

A primary object of the present invention is to provide an electro-wetting display panel comprising a first transparent substrate; a second transparent substrate disposed opposite to the first transparent substrate; and a plurality of pixel units. The pixel units comprises a plurality of first electrodes disposed in pixel areas of the first transparent substrate; a first hydrophobic layer disposed on the first electrodes; a plurality of first barriers disposed on the first hydrophobic layer and around the pixel areas of the first transparent substrate; a plurality of second electrodes disposed on the second transparent substrate; a second hydrophobic layer disposed on the second electrodes; a polarized liquid disposed between the second hydrophobic layer and the first hydrophobic layer; a plurality of first non-polarized liquids disposed on the first hydrophobic layer and close to the first barriers, respectively; a plurality of second barriers disposed on the second hydrophobic layer and around the pixel areas of the second transparent substrate; a plurality of second non-polarized liquids disposed on the second hydrophobic layer and close to the second barriers, respectively; wherein a plurality of first recess areas are formed on the first hydrophobic layer and close to the corresponding first barriers for receiving portions of the first non-polarized liquids, and a plurality of projection portions are formed on the second electrodes and far away the first barriers.

In the electro-wetting display panel of the present invention, a plurality of second recess areas are formed on the second hydrophobic layer, and close to the corresponding second barriers for receiving portions of the second non-polarized liquids.

In the electro-wetting display panel of the present invention, the pixel units comprise the second hydrophobic layer smoothly disposed on the second electrodes; the plurality of second barriers disposed on the second hydrophobic layer and around the pixel areas of the second transparent substrate; the plurality of second non-polarized liquids disposed on the second hydrophobic layer and close to the second barriers, respectively, wherein the polarized liquid is disposed between the second hydrophobic layer and the first hydrophobic layer.

In the electro-wetting display panel of the present invention, a plurality of second recess areas are formed on the second hydrophobic layer, and close to the corresponding second barriers for receiving portions of the second non-polarized liquids.

Another object of the present invention is to provide an electro-wetting display panel comprising a first transparent substrate; a second transparent substrate disposed opposite to the first transparent substrate; and a plurality of pixel units. The pixel units comprise: a plurality of first electrodes disposed in pixel areas of the first transparent substrate; a first hydrophobic layer disposed on the first electrodes; a plurality of first barriers disposed on the first hydrophobic layer and around the pixel areas of the first transparent substrate; at least one second electrode disposed on the second transparent substrate; a second hydrophobic layer disposed on the at least one second electrode; a polarized liquid disposed between the at least one second electrode and the first hydrophobic layer; a plurality of first non-polarized liquids disposed on the first hydrophobic layer and close to the first barriers, respectively; wherein a plurality of first recess areas are formed on the first hydrophobic layer and close to the corresponding first barriers for receiving portions of the first non-polarized liquids.

In the electro-wetting display panel of the present invention, the pixel units further comprise the second hydrophobic layer disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liquid is disposed between the second hydrophobic layer and the first hydrophobic layer.

In the electro-wetting display panel of the present invention, a plurality of second recess areas are formed on the second hydrophobic layer, and close to the corresponding second barriers for receiving portions of the second non-polarized liquids.

In the electro-wetting display panel of the present invention, a plurality of projection portions are formed on the second electrodes and far away the first barriers.

In the electro-wetting display panel of the present invention, the pixel units further comprise the second hydrophobic layer smoothly disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liquid is disposed between the second hydrophobic layer and the first hydrophobic layer.

In the electro-wetting display panel of the present invention, a plurality of second recess areas are formed on the second hydrophobic layer, and close to the corresponding second barriers for receiving portions of the second non-polarized liquids.

Still another object of the present invention is to provide an electro-wetting display apparatus comprising a light source module configured to emit light rays; and an electro-wetting display pane. The electro-wetting display pane comprises: a first transparent substrate; a second transparent substrate disposed opposite to the first transparent substrate; and a plurality of pixel units. The pixel units comprise: a plurality of first electrodes disposed in pixel areas of the first transparent substrate; a first hydrophobic layer disposed on the first electrodes; a plurality of first barriers disposed on the first hydrophobic layer and around the pixel areas of the first transparent substrate; at least one second electrode disposed on the second transparent substrate; a second hydrophobic layer disposed on the at least one second electrode; a polarized liquid disposed between the at least one second electrode and the first hydrophobic layer; a plurality of first non-polarized liquids disposed on the first hydrophobic layer and close to the first barriers, respectively; wherein a plurality of first recess areas are formed on the first hydrophobic layer and close to the corresponding first barriers for receiving portions of the first non-polarized liquids.

In the electro-wetting display apparatus of the present invention, the pixel units further comprise the second hydrophobic layer disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liquid is disposed between the second hydrophobic layer and the first hydrophobic layer.

In the electro-wetting display apparatus I of the present invention, a plurality of second recess areas are formed on the second hydrophobic layer, and close to the corresponding second barriers for receiving portions of the second non-polarized liquids.

In the electro-wetting display apparatus of the present invention, a plurality of projection portions are formed on the second electrodes and far away the first barriers.

In the electro-wetting display apparatus of the present invention, the pixel units further comprise the second hydrophobic layer smoothly disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liquid is disposed between the second hydrophobic layer and the first hydrophobic layer.

In the electro-wetting display apparatus of the present invention, a plurality of second recess areas are formed on the second hydrophobic layer, and close to the corresponding second barriers for receiving portions of the second non-polarized liquids.

In comparison with the conventional electro-wetting display panel and apparatus using the same, in the electro-wetting display panel and the electro-wetting display apparatus of the present invention, the hysteresis phenomenon of the oil layer (non-polarized liquids) can be prevented by using the recess areas on the hydrophobic layer, so as to prevent the problem of a poor display quality resulting from the hysteresis phenomenon.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 2:
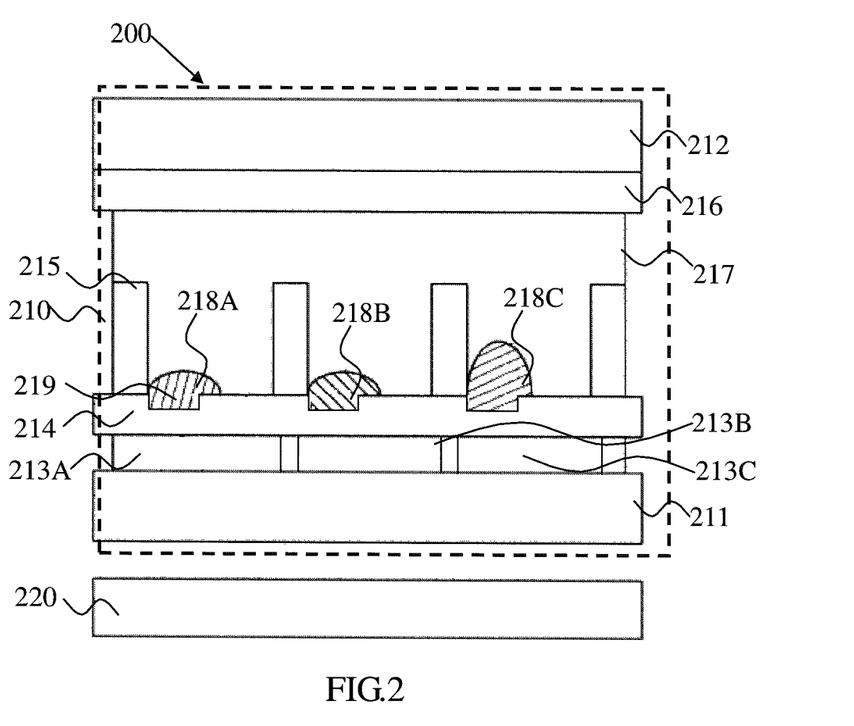
FIG. 2 is a schematic diagram showing an electro-wetting display apparatus according to a first embodiment of the present invention.

FIG. 2 is a schematic diagram showing an electro-wetting display apparatus according to a first embodiment of the present invention. The electro-wetting display apparatus 200 of the present embodiment comprises an electro-wetting display panel 210 and a light source module 220. The light source module 220 is configured to emit light rays. The electro-wetting display panel 210 comprises a first transparent substrate 211, a second transparent substrate 212, and pixel units. The first transparent substrate 211 and the second transparent substrate 212 are disposed opposite to each other.

The pixel units comprise first electrodes 213A, 213B, and 213C, a first hydrophobic layer 214, a plurality of first barriers 215, a second electrode 216, a polarized liquid 217 and a plurality of first non-polarized liquids 218A, 218B, and 218C. The first electrodes 213 are disposed in pixel areas of the first transparent substrate 211, and the first hydrophobic layer 214 is disposed on the first electrodes 213. The plurality of first barriers 215 are disposed on the first hydrophobic layer 214 and around the pixel areas of the first transparent substrate 211. The second electrode 216 is disposed on the second transparent substrate 212, and the polarized liquid 217 is disposed between the second electrode 216 and the first hydrophobic layer 214. The plurality of first non-polarized liquids 218 are disposed on the first hydrophobic layer 214 and close to the first barriers 215, respectively.

In this embodiment, a plurality of recess areas 219 are formed on the first hydrophobic layer 214 and close to the corresponding first barriers 215 for receiving portions of the first non-polarized liquids 218.

When using the electro-wetting display apparatus 200 of the present embodiment, according to a color gray-scale of each of the pixels of the images, different colors of red, green and blue having different gray-scales can be presented. In this case, corresponding voltages are applied to the first electrodes 213A corresponding to the red pixel units, the first electrodes 213B corresponding to the green pixel units, and the first electrodes 213C corresponding to the blue pixel units, and a common voltage is applied to the second electrode 216. In this manner, arrangements or distributions of the first non-polarized liquids 218A corresponding to the red pixel units, the first non-polarized liquids 218B corresponding to the green pixel units, and the first non-polarized liquids 218C corresponding to the blue pixel units on the first hydrophobic layer 214 can be controlled. Accordingly, the light rays emitted from the light source can be transferred into red lights, green lights and blue lights having different gray-scales by passing through the first non-polarized liquids 218A, 218B, and 218C.

When a red light of a high gray-scale is required, a relatively low voltage or no voltage is applied to the first electrode 213A corresponding to the red pixel unit, and the first non-polarized liquids 218A corresponding to the red pixel units can be uniformly distributed on the pixel areas of the red pixel units. Accordingly, the light rays emitted from the light source can be transferred into the red lights of the high gray-scale by passing through the first non-polarized liquids 218A.

When a red light of a low gray-scale is required, a relatively high voltage is applied to the first electrode 213A corresponding to the red pixel unit, and the first non-polarized liquids 218A corresponding to the red pixel units can be gathered at the recess areas 219 on the first hydrophobic layer 214 and close to the corresponding first barriers 215. Accordingly, only a few or a small amount of the light rays emitted from the light source can be transferred into the red lights by passing through the first non-polarized liquids 218A.

A green light of a high or low gray-scale or a blue light of a high or low gray-scale can be formed by the above-mentioned manner. With the use of the recess areas 219 on the first hydrophobic layer 214, when the relatively high voltage is applied to the first electrodes 213A, 213B, and 213C, the first non-polarized liquids 218A, 218B, and 218C can be gathered at the recess areas 219 very well, thereby preventing the hysteresis phenomenon of the first non-polarized liquids 218A, 218B, and 218C on the first hydrophobic layer 214.

Therefore, in the electro-wetting display apparatus 200 of the present embodiment, the hysteresis phenomenon of the non-polarized liquids can be prevented by using the recess areas on the hydrophobic layer.

Figure 3:
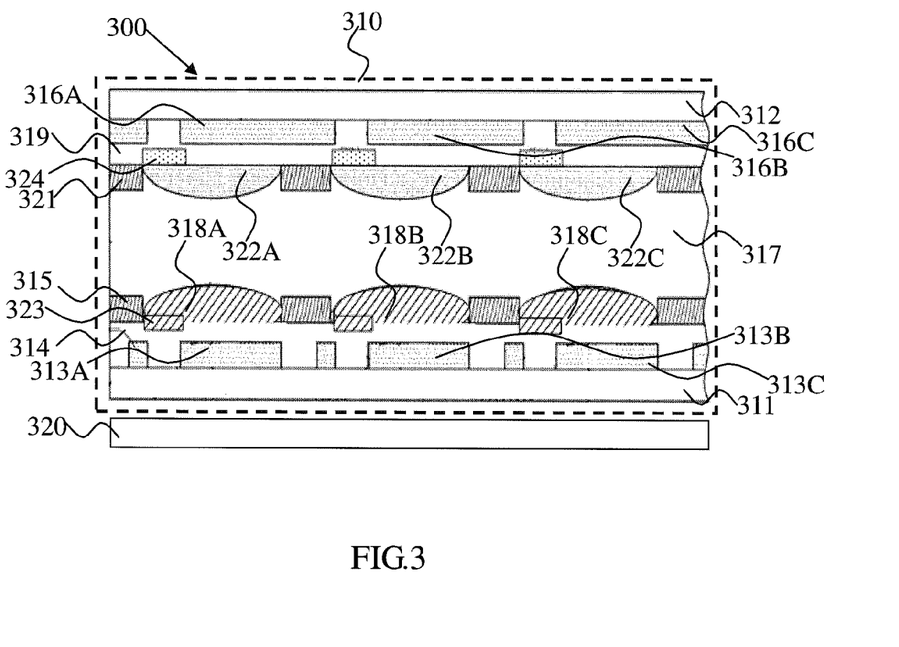
FIG. 3 is a schematic diagram showing an electro-wetting display apparatus according to a second embodiment of the present invention.

FIG. 3 is a schematic diagram showing an electro-wetting display apparatus according to a second embodiment of the present invention. The electro-wetting display apparatus 300 of the present embodiment comprises an electro-wetting display panel 310 and a light source module 320. The light source module 320 is configured to emit light rays. The electro-wetting display panel 310 comprises a first transparent substrate 311, a second transparent substrate 312, and pixel units. The first transparent substrate 311 and the second transparent substrate 312 are disposed opposite to each other.

The pixel units comprise first electrodes 313A, 313B, and 313C, a first hydrophobic layer 314, a plurality of first barriers 315, second electrodes 316A, 316B, and 316C, a polarized liquid 317, and a plurality of first non-polarized liquids 318A, 318B, and 318C, a second hydrophobic layer 319, a plurality of second barriers 321, and a plurality of second non-polarized liquids 322A, 322B, and 322C.

The first electrodes 313A, 313B, and 313C are disposed in pixel areas of the first transparent substrate 311, and the first hydrophobic layer 314 is disposed on the first electrodes 313. The plurality of first barriers 315 are disposed on the first hydrophobic layer 314 and around the pixel areas of the first transparent substrate 311. The second electrodes 316A, 316B, and 316C are disposed in pixel areas of the second transparent substrate 312. The first non-polarized liquids 318A, 318B, and 318C are disposed on the first hydrophobic layer 314 and close to the first barriers 315, respectively. The second hydrophobic layer 319 is disposed on the second electrodes 316A, 316B, and 316C. The plurality of second barriers 321 are disposed on the second hydrophobic layer 319 and around the pixel areas of the second transparent substrate 312. The second non-polarized liquids 322A, 322B, and 322C are disposed on the second hydrophobic layer 319 and close to the second barriers 321, respectively. The polarized liquid 317 is disposed between the first hydrophobic layer 314 and the second hydrophobic layer 319.

In this embodiment, a plurality of first recess areas 323 are formed on the first hydrophobic layer 314 and close to (or adjacent to) the corresponding first barriers 315 for receiving portions of the first non-polarized liquids 318A, 318B, and 318C. Meanwhile, a plurality of second recess areas 324 are formed on the second hydrophobic layer 319, and close to the corresponding second barriers 321 for receiving portions of the second non-polarized liquids 322A, 322B, and 322C.

When using the electro-wetting display apparatus 300 of the present embodiment, according to a color gray-scale of each of the pixels of the images, different colors of red, green and blue having different gray-scales can be presented. In this case, corresponding voltages are applied to the first electrodes 313A corresponding to the red pixel units, the first electrodes 313B corresponding to the green pixel units, and the first electrodes 313C corresponding to the blue pixel units In this manner, arrangements or distributions of the first non-polarized liquids 318A corresponding to the red pixel units, the first non-polarized liquids 318B corresponding to the green pixel units, and the first non-polarized liquids 318C corresponding to the blue pixel units on the first hydrophobic layer 314 can be controlled. Accordingly, the light rays emitted from the light source can be transferred into red lights, green lights and blue lights having different gray-scales by passing through the first non-polarized liquids 318A, 318B, and 318C.

According to a display brightness of each pixel of the displayed images, different brightness of the red lights, green lights and blue lights can be determined. In this case, corresponding voltages are applied to the second electrodes 316A corresponding to the red pixel units, the second electrodes 316B corresponding to the green pixel units, and the second electrodes 316C corresponding to the blue pixel units, respectively.

In this manner, arrangements or distributions of the second non-polarized liquids 322A corresponding to the red pixel units, the f second non-polarized liquids 322B corresponding to the green pixel units, and the second non-polarized liquids 322C corresponding to the blue pixel units on the second hydrophobic layer 319 can be controlled. Accordingly, different brightness of the light rays emitted from the light source can be formed and controlled by passing through the second non-polarized liquids 322A, 322B, and 322C.

A red light of a high or low gray-scale and a high or low brightness, a green light of a high or low gray-scale and a high or low brightness, and a blue light of a high or low gray-scale and a high or low brightness can be formed and controlled by the above-mentioned manner. With the use of the first recess areas 323 on the first hydrophobic layer 314, when the relatively high voltage is applied to the first electrodes 313A, 313B, and 313C, the first non-polarized liquids 318A, 318B, and 318C can be gathered at the first recess areas 323 very well, thereby preventing the hysteresis phenomenon of the first non-polarized liquids 318A, 318B, and 318C on the first hydrophobic layer 314. With the use of the second recess areas 324 on the second hydrophobic layer 319, when the relatively high voltage is applied to the second electrodes 316A, 316B, and 316C, the second non-polarized liquids 322A, 322B, and 322C can be gathered at the second recess areas 324 very well, thereby preventing the hysteresis phenomenon of the second non-polarized liquids 322A, 322B, and 322C on the second hydrophobic layer 319.

Therefore, in the electro-wetting display apparatus of the present embodiment, the gray-scale and the brightness can be adjusted more precisely by the first recess areas on the first hydrophobic layer and the second recess areas on the second hydrophobic layer.

Figure 4:
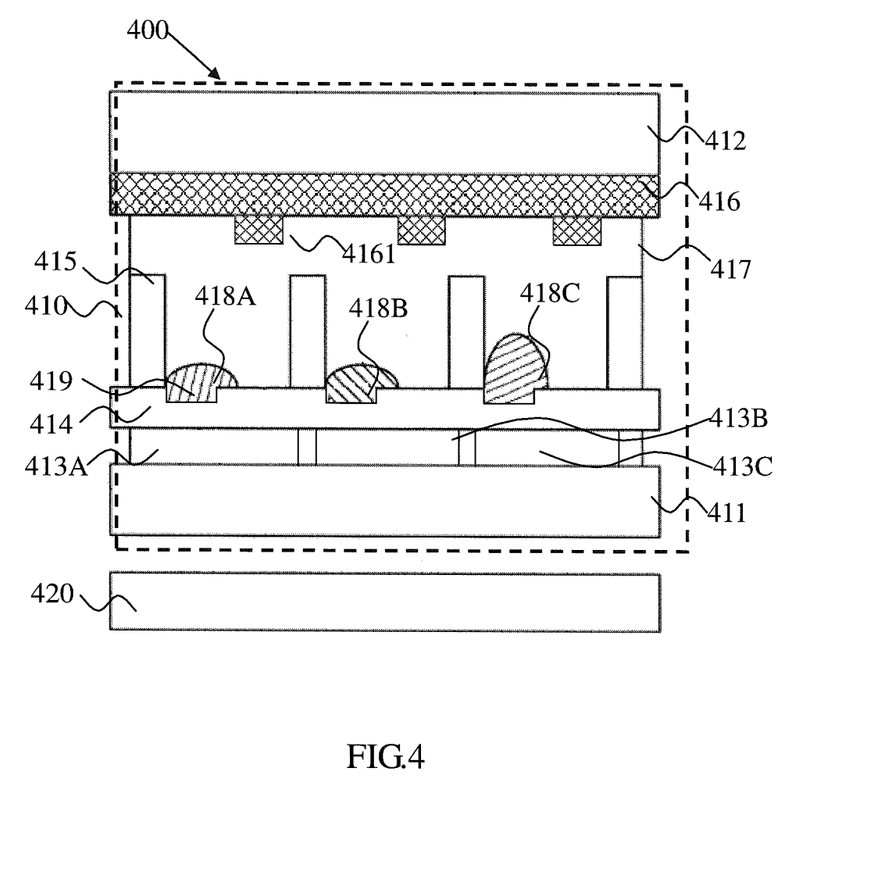
FIG. 4 is a schematic diagram showing an electro-wetting display apparatus according to a third embodiment of the present invention.

FIG. 4 is a schematic diagram showing an electro-wetting display apparatus according to a third embodiment of the present invention. The electro-wetting display apparatus 400 of the present embodiment comprises an electro-wetting display panel 410 and a light source module 420. The light source module 420 is configured to emit light rays. The electro-wetting display panel 410 comprises a first transparent substrate 411, a second transparent substrate 412, and pixel units. The first transparent substrate 411 and the second transparent substrate 412 are disposed opposite to each other.

The pixel units comprise first electrodes 413A, 413B, and 413C, a first hydrophobic layer 414, a plurality of first barriers 415, a second electrode 416, a polarized liquid 417 and a plurality of first non-polarized liquids 418A, 418B, and 418C. The first electrodes 413 are disposed in pixel areas of the first transparent substrate 411, and the first hydrophobic layer 414 is disposed on the first electrodes 413. The plurality of first barriers 415 are disposed on the first hydrophobic layer 414 and around the pixel areas of the first transparent substrate 411. The second electrode 416 is disposed on the second transparent substrate 412, and the polarized liquid 417 is disposed between the second electrode 416 and the first hydrophobic layer 414. The plurality of first non-polarized liquids 418 are disposed on the first hydrophobic layer 414 and close to the first barriers 415, respectively.

In this embodiment, a plurality of recess areas 419 are formed on the first hydrophobic layer 414 and close to the corresponding first barriers 415 for receiving portions of the first non-polarized liquids 418.

In this embodiment, a plurality of projection portions 4161 are formed on the second electrode 416 and far away the corresponding first barriers 415 (or the corresponding recess areas 419).

In the electro-wetting display apparatus 400 of the present embodiment, with the use of the projection portions 4161 on the second electrode 416, when the voltage is applied to the first electrodes 413A, 413B, and 413C, the first non-polarized liquids 418A, 418B, and 418C can be gathered at the recess areas 419 more easily, thereby preventing the hysteresis phenomenon of the first non-polarized liquids 418A, 418B, and 418C on the first hydrophobic layer 414.

Therefore, in the electro-wetting display apparatus of the present embodiment, the hysteresis phenomenon of the non-polarized liquids can be prevented by using the projection portions on the second electrode.

Figure 5:
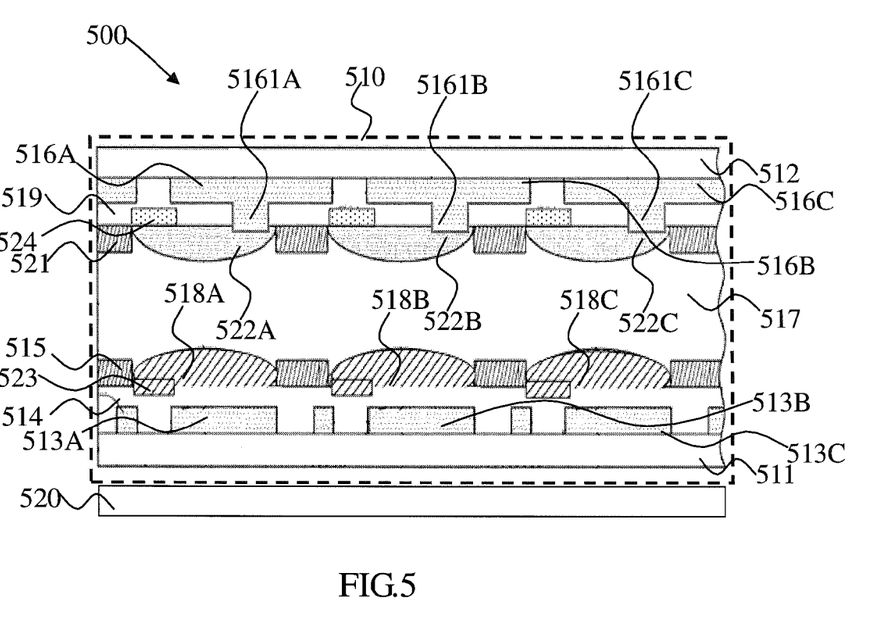
FIG. 5 is a schematic diagram showing an electro-wetting display apparatus according to a fourth embodiment of the present invention.

FIG. 5 is a schematic diagram showing an electro-wetting display apparatus according to a fourth embodiment of the present invention. The electro-wetting display apparatus 500 of the present embodiment comprises an electro-wetting display panel 510 and a light source module 520. The light source module 520 is configured to emit light rays. The electro-wetting display panel 510 comprises a first transparent substrate 511, a second transparent substrate 512, and pixel units. The first transparent substrate 511 and the second transparent substrate 512 are disposed opposite to each other.

The pixel units comprise first electrodes 513A, 513B, and 513C, a first hydrophobic layer 514, a plurality of first barriers 515, second electrodes 516A, 516B, and 516C, a polarized liquid 517, and a plurality of first non-polarized liquids 518A, 518B, and 518C, a second hydrophobic layer 519, a plurality of second barriers 521, and a plurality of second non-polarized liquids 522A, 522B, and 522C.

The first electrodes 513A, 513B, and 513C are disposed in pixel areas of the first transparent substrate 511, and the first hydrophobic layer 514 is disposed on the first electrodes 513A, 513B, and 513C. The plurality of first barriers 515 are disposed on the first hydrophobic layer 514 and around the pixel areas of the first transparent substrate 511. The second electrodes 516A, 516B, and 516C are disposed in pixel areas of the second transparent substrate 512. The first non-polarized liquids 518A, 518B, and 518C are disposed on the first hydrophobic layer 514 and close to the first barriers 515, respectively. The second hydrophobic layer 519 is disposed on the second electrodes 516A, 516B, and 516C. The plurality of second barriers 521 are disposed on the second hydrophobic layer 519 and around the pixel areas of the second transparent substrate 512. The second non-polarized liquids 522A, 522B, and 522C are disposed on the second hydrophobic layer 519 and close to the second barriers 521, respectively. The polarized liquid 517 is disposed between the first hydrophobic layer 514 and the second hydrophobic layer 519.

In this embodiment, a plurality of first recess areas 523 are formed on the first hydrophobic layer 514 and close to the corresponding first barriers 515 for receiving portions of the first non-polarized liquids 518A, 518B, and 518C. Meanwhile, a plurality of second recess areas 524 are formed on the second hydrophobic layer 519, and close to (or adjacent)

the corresponding second barriers 521 for receiving portions of the second non-polarized liquids 522A, 522B, and 522C.

In this embodiment, a plurality of projection portions 5161A, 5161B, 516C are formed on the second electrodes 516A, 516B, 516C and far away the corresponding first barriers 515 (or the corresponding second recess areas 524).

Similar to the second and third embodiments, the using and working process of the electro-wetting display apparatus can be referred to the relevant description in the second and third embodiments.

Therefore, in the electro-wetting display apparatus of the present embodiment, the gray-scale and the brightness can be adjusted more precisely by the first recess areas on the first hydrophobic layer and the second recess areas on the second hydrophobic layer.

In the electro-wetting display panel and the electro-wetting display apparatus of the present invention, the hysteresis phenomenon of the oil layer (non-polarized liquids) can be prevented by using the recess areas on the hydrophobic layer, so as to prevent the problem of a poor display quality resulting from the hysteresis phenomenon.

The present invention has been described with preferred embodiments thereof and it is understood that many changes and modifications to the described embodiments can be carried out without departing from the scope and the spirit of the invention that is intended to be limited only by the appended claims.

The invention claimed is:

1. An electro-wetting display panel, comprising:
a first transparent substrate;
a second transparent substrate disposed opposite to the first transparent substrate; and
a plurality of pixel units comprising:
a plurality of first electrodes disposed in pixel areas of the first transparent substrate;
a first hydrophobic layer disposed on the first electrodes;
a plurality of first barriers disposed on the first hydrophobic layer and around the pixel areas of the first transparent substrate;
a plurality of second electrodes disposed on the second transparent substrate;
a second hydrophobic layer disposed on the second electrodes;
a polarized liquid disposed between the second hydrophobic layer and the first hydrophobic layer;
a plurality of first non-polarized liquids disposed on the first hydrophobic layer and close to the first barriers, respectively;
a plurality of second barriers disposed on the second hydrophobic layer and around the pixel areas of the second transparent substrate; and
a plurality of second non-polarized liquids disposed on the second hydrophobic layer and close to the second barriers, respectively;
wherein a plurality of first recess areas are formed on the first hydrophobic layer and close to the corresponding first barriers for receiving portions of the first non-polarized liquids, and a plurality of projection portions are formed on the second electrodes and far away the first barriers.

2. The electro-wetting display panel according to claim 1, wherein a plurality of second recess areas are formed on the second hydrophobic layer, and close to the corresponding second barriers for receiving portions of the second non-polarized liquids.

3. The electro-wetting display panel according to claim 1, wherein the pixel units comprise the second hydrophobic layer smoothly disposed on the second electrodes; the plurality of second barriers disposed on the second hydrophobic layer and around the pixel areas of the second transparent substrate; the plurality of second non-polarized liquids disposed on the second hydrophobic layer and close to the second barriers, respectively, wherein the polarized liquid is disposed between the second hydrophobic layer and the first hydrophobic layer.

4. The electro-wetting display panel according to claim 3, wherein a plurality of second recess areas are formed on the second hydrophobic layer, and close to the corresponding second barriers for receiving portions of the second non-polarized liquids.

5. An electro-wetting display apparatus, comprising:
a light source module configured to emit light rays; and
an electro-wetting display pane comprising:
a first transparent substrate;
a second transparent substrate disposed opposite to the first transparent substrate; and
a plurality of pixel units comprising:
a plurality of first electrodes disposed in pixel areas of the first transparent substrate;
a first hydrophobic layer disposed on the first electrodes;
a plurality of first barriers disposed on the first hydrophobic layer and around the pixel areas of the first transparent substrate;
at least one second electrode disposed on the second transparent substrate;
a second hydrophobic layer disposed on the at least one second electrode;
a polarized liquid disposed between the at least one second electrode and the first hydrophobic layer; and
a plurality of first non-polarized liquids disposed on the first hydrophobic layer and close to the first barriers, respectively;
wherein a plurality of first recess areas are formed on the first hydrophobic layer and close to the corresponding first barriers for receiving portions of the first non-polarized liquids;
wherein a plurality of protection portions are formed on the second electrodes and far away from the first barriers; and
wherein the pixel units further comprise the second hydrophobic layer smoothly disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liguid is disposed between the second hydrophobic layer and the first hydrophobic layer.

6. The electro-wetting display apparatus according to claim 5, wherein the pixel units further comprise the second hydrophobic layer disposed on the plurality of second electrodes; a plurality of second barriers disposed on the second hydrophobic layer and around the pixel areas of the second transparent substrate; a plurality of second non-polarized liquids disposed on the second hydrophobic layer and close to the second barriers, respectively, wherein the polarized liquid is disposed between the second hydrophobic layer and the first hydrophobic layer.

7. The electro-wetting display apparatus according to Claim 6, wherein a plurality of second recess areas are formed on the second hydrophobic layer, and close to the corresponding second barriers for receiving portions of the second non-polarized liquids.

8. The electro-wetting display apparatus according to claim 5, wherein a plurality of second recess areas are formed on the second hydrophobic layer, and close to the corresponding second barriers for receiving portions of the second non-polarized liquids.

* * * * *